United States Patent [19]

LaValley

[11] Patent Number: 4,680,115
[45] Date of Patent: Jul. 14, 1987

[54] FILTRATE DISCHARGE ACCELERATOR SYSTEM FOR CENTER VALVE FILTER DRUMS

[75] Inventor: Richard W. LaValley, Vancouver, Wash.

[73] Assignee: LaValley Industrial Plastics, Inc., Vancouver, Wash.

[21] Appl. No.: 812,910

[22] Filed: Dec. 23, 1985

[51] Int. Cl.⁴ ............................................. B01D 33/06
[52] U.S. Cl. ................................... 210/247; 210/404; 162/335
[58] Field of Search ............... 210/402, 403, 404, 247; 162/323, 357, 335

[56] References Cited

U.S. PATENT DOCUMENTS

| | | | |
|---|---|---|---|
| 770,307 | 9/1904 | Parker | 162/357 |
| 2,537,414 | 1/1951 | Lindblad | 210/404 |
| 2,998,883 | 9/1961 | Rich | 210/404 |
| 3,125,514 | 3/1964 | Frykhult | 210/404 |
| 3,150,083 | 9/1964 | Luthi | 210/404 |
| 3,305,439 | 2/1967 | Siegel | 162/357 |
| 3,306,457 | 2/1967 | Putnam | 210/404 |
| 3,794,178 | 2/1974 | Luthi | 210/404 |
| 4,154,687 | 5/1979 | LaValley | 210/392 |

OTHER PUBLICATIONS

*Handbook for Pulp and Paper Technologists*, G. A. Smook, Canadian Pulp and Paper Association, Montreal, Quebec, 1982, p. 111.

*Primary Examiner*—Richard V. Fisher
*Assistant Examiner*—Linda S. Evans
*Attorney, Agent, or Firm*—Marger & Johnson

[57] ABSTRACT

A center valve rotary drum filter includes radially disposed baffles or vanes which extend in the center valve opening from axial surface channels to a central drainage conduit. The baffles provide channels in the center valve opening which collect, direct, and accelerate filtrate flow toward the drainage conduit thereby improving the overall operating efficiency of the filter. The center valve rotary drum filter further includes a curved flow passage between the flow-confining walls. This flow passage is curved toward the central axis of the drainage conduit for directing filtrate flow to the drainage conduit. In a preferred case, the curved flow passage comprises a concavely curved, cone-like member having a broad proximal base and a narrow distal end. The base end is directed toward the one of the radial flow-confining walls opposite the entrance to the drainage conduit, the distal end being directed toward the central axis of the drainage conduit.

13 Claims, 3 Drawing Figures

FILTRATE DISCHARGE ACCELERATOR SYSTEM FOR CENTER VALVE FILTER DRUMS

BACKGROUND OF THE INVENTION

The present invention relates generally to rotary drum filters and more particularly to center external valve rotary drum filters.

Rotary drum filters are commonly used in the pulp and paper-making industry to separate wood pulp from its filtrate. Such filters include a rotary drum partially submerged in a tank of pulp slurry. The drum has axially extending filtrate channels or compartments spaced about its periphery and covered by a filter screen.

There are two general types of drum filters, the center valve type and the pipe machine or end valve type. In a center valve type filter each filtrate compartment drains into a center circumferential valve opening which communicates through a central axial discharge pipe with a remote source of subatmospheric pressure. An arcuate, stationary valve closure member is mounted at the periphery of and extends partially about the channel. As the drum rotates about its axis with subatmospheric pressure being applied, the screen rotates through the pulp slurry, collecting a wet mat of fibers from the slurry. As the screen emerges from the tank, filtrate is drawn through the screen from the pulp and drains through the axial compartments into the center valve opening, and from there through the axial discharge pipe from the drum, thereby removing the liquid from the mat. As the drum continues to rotate, the stationary valve member periodically blocks off a segment of filtrate compartment outlets from the source of subatmospheric pressure, thus enabling removal of the pulp mat from the surface of the screen. A center valve type rotary drum filter is described in more detail in, for example, U.S. Pat. No. 4,154,687.

Filtrate drawn through the screen and drained into the center valve opening from the axial filtrate compartments tumbles randomly and turbulently under the influence of the subatmospheric pressure and, in upper segments of the drum, gravity, into the central discharge pipe. This random, generally radial flow converges at the opening of the discharge pipe, creating further turbulence. The unrestricted valve opening is never filled with filtrate. The turbulent, random radial flow entraps air and produces resistance to discharge flow and loss of pressure head. There is therefore a need for a more efficient and effective means for promoting filtrate drainage from center valve filter drums than is presently available.

A number of references disclose ways of directing filtrate from the surface of a rotary drum filter to a central drainage conduit. For example, U.S. Pat. No. 2,998,883 to Rich discloses a rotary drum filter which includes a pair of axially disposed collection troughs which distribute filtrate to a central drainage pipe through a pipe extending from the bottom of each channel at an end of the drum. U.S. Pat. No. 3,794,178 to Luthi discloses a rotary drum filter having axially disposed surface channels. Filtrate is fed from each channel to a central drainage conduit through pipes located at the end of the drum. U.S. Pat. No. 3,150,083 to Luthi discloses a valveless rotary drum filter having a large number of axially aligned, radial directed channels which spiral radially inward toward the center of the drum.

None of the drums of the foregoing references are center valve filters or directed to solving the discharge filtrate flow problems of such filters except by, in effect, replacing such filters.

The "*Handbook for Pulp and Paper Technologists*", G. A. Smook, Canadian Pulp and Paper Association, Montreal, Quebec, 1982, at page 111, discloses an unusual internal center valve type rotary drum filter. Radial vanes provide radial extensions of the usual axial surface channels to channel filtrate to the internal valve. The vanes are apparently required to direct filtrate flow to specific ports of the internal valve to enable the valve to function. In this respect, the filter resembles the pipe machine type. Also, the large number of closely spaced vanes would apparently create substantially more resistance to filtrate flow than is provided by the more usual external center valve filter drums previously described.

While each of the above references discloses ways for directing filtrate flows inward toward the center of a rotary drum filter, none shows or suggests a way of overcoming the inefficient filtrate drainage flow inherent in existing external center valve rotary drum filters between the valve and the central drainage pipe.

Accordingly, it is an object of the present invention to reduce the pressure head loss and flow resistance in the valve opening of an external center valve rotary drum filter.

Another object of the present invention is to accelerate filtrate drainage flow from the surface drainage channels to the central drainage pipe in an external center valve drum filter.

Yet another object of the present invention is to provide a means for increasing the filtrate drainage efficiency of external center valve drum filters.

SUMMARY OF THE INVENTION

The invention is a center valve rotary drum filter in which generally radially disposed plural baffle means from the axial surface channels in the center valve opening collect, direct and accelerate filtrate flow toward and into the central drainage conduit, thereby improving the overall operating efficiency of the filter.

The baffle means are circumferentially spaced apart and positioned within the center valve opening downstream of the stationary external central valve. The baffle means extend between radial flow-confining walls to define with the walls discrete filtrate flow channels within the valve opening, such channels having flow cross sections which become progressively smaller in the radial inward direction to accelerate flow.

At the entrance to the central discharge conduit, the flow paths of the filtrate curve progressively from a radial to an axial direction, providing a smooth, accelerating transition and further promoting efficient, nonturbulent drainage flow.

These and other objects, features and advantages of the foregoing invention will become more readily apparent in the following detailed description of a preferred embodiment which proceeds with reference to the accompanying drawings.

DETAILED DESCRIPTION OF A PREFERRED EMBODIMENT

Figure 1:
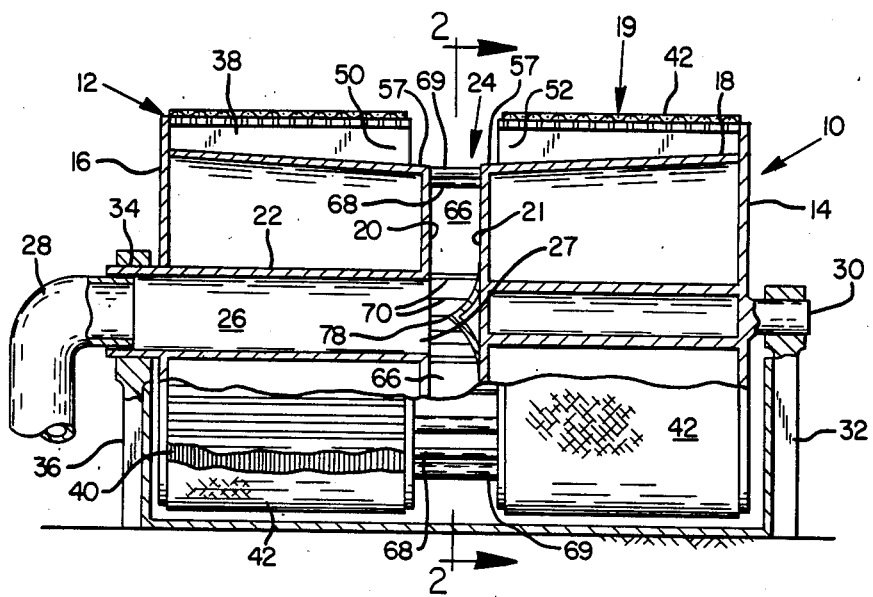
FIG. 1 is a front elevational view of an external central valve rotary drum filter with surface portions of the drum broken away to show interior portions of the drum in section.

An external central valve rotary drum filter 10 includes a generally cylindrical drum 12 with flat opposite end walls 14, 16 and a generally cylindrical deck plate 18. A deck structure, indicated generally at 19, is disposed outwardly of and is mounted to deck plate 18. Central axially spaced, radially extending, flow-confining walls 20, 21 together with an axially extending, cylindrical inner wall or pipe 22 define an interior drum flow passage including a radial central circumferential valve opening 24 and an axial drainage conduit 26 opening at 27 into the valve opening. Drainage conduit 26 is connected at its opposite end to an external pipe 28. External pipe 28 is connected to a source of subatmospheric pressure (not shown). Drum 12 is rotatably mounted by a shaft 30 on a first support 32 at one end and by an external extension 34 of inner wall 22 on a second support 36 at the opposite end. The drum is rotatably driven by means (not shown) well known in the art.

Deck plate 18 supports a plurality of circumferentially spaced, axially extending, and radially projecting channel members or ribs 38. A plurality of parallel, axially spaced, circumferentially extending ribs or ridges 40 are supported on and disposed outwardly of channel members 38 to define drainage grooves therebetween. Ribs 40 extend around the entire periphery of drum 12 and thereby serve collectively as a perforate support means to support a filter screen 42 which also extends around the periphery of drum 12.

Figure 2:
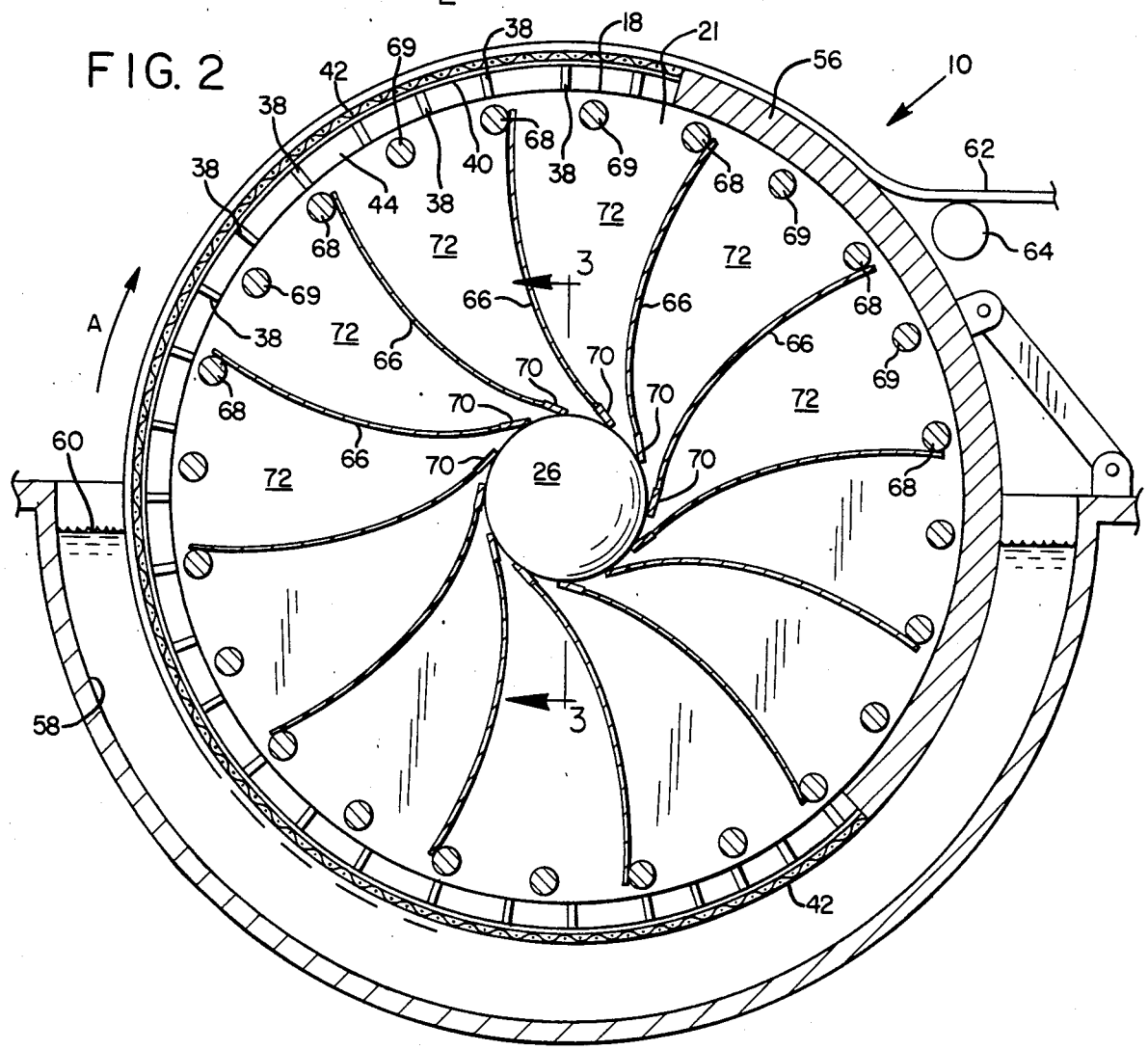
FIG. 2 is an enlarged vertical sectional view taken along line 2—2 of FIG. 1.

Axially extending channel members 38 define axial filtrate channels 44. Channels 44 are closed at their axially outer ends but open at their inner ends at openings 50 and 52 to the central, circumferentially extending valve opening 24. Opening 24 receives at its periphery a stationary arcuate valve member 56, which extends through a predetermined arc of the drum periphery as shown in FIG. 2. The valve member rides on a valve seat 57 as the drum rotates.

Drum 12 is partially submerged in a tank 58 which typically contains a pulp slurry 60. As the drum rotates in a clockwise direction, as indicated by arrow A in FIG. 2, valve member 56 periodically blocks off each filtrate channel 44 from communication with the subatmospheric pressure within drum passages 24, 26 and external pipe 28. This permits the removal of a pulp mat 62 from drum 12 at a roller 64.

Mat 62 is formed as follows: as drum 12 rotates in pulp slurry 60, a partial vacuum is applied to filtrate channels 44, causing pulp fibers in the slurry to collect on the surface of filter screen 42. As filter screen 42 emerges from slurry 60, the vacuum continues to be applied, drawing filtrate liquid from mat 62 into filtrate channels 44. The floors of filtrate channels 44 formed by deck plate 18 are sloped radially inward toward central valve opening 24, promoting filtrate drainage from the axial channels into valve opening 24. From opening 24, filtrate flows into axial conduit 26 and out drain pipe 28. As consecutive filtrate compartments become sealed off from the continuously applied vacuum by stationary valve member 56, the drained pulp mat 62 on the segment of the screen cut off from suction can be removed from the screen.

Referring more particularly to FIG. 2, radially extending walls 20, 21 are interconnected at their periphery by support rods 68, 69 which extend across radial channel 24. Walls 20, 21 are interconnected at their inner most portions by flat support bars 70 which extend across radial channel 24 adjacent and roughly tangential to drainage conduit 26. Supports 68, 69, 70 provide rigidity to the drum structure 10 by interconnecting the two axial halves of the drum.

Radial valve opening 24 is subdivided by a plurality of generally radially directed, curved baffle members or vanes 66 into flow channels 72. Baffle members 66 are supported at their outermost ends by outer support members 68. The radially innermost portions of baffles 66 terminate at inner support members 70. The baffles align with flat supports 70 to minimize flow obstruction to drainage conduit 26.

As shown, baffles 66 are positioned downstream of stationary valve 56 and extend between flow-confining walls 20, 21. Directing the filtrate flow in separate discrete channels 72 between walls 20, 21 as described reduces the amount of turbulence otherwise occcuring when the filtrate randomly flows from different peripheral points and randomly converges at the drainage conduit. In this manner, channels 72 collect the liquid and confine it adjacent conduit 26 so the suction acts on liquid filtrate and not so much on air.

As shown, baffles 66 curve toward drainage conduit 26. Such curvature is believed to enhance collection and acceleration of flow through radial channels 72 into the drainage conduit 26. Baffles 66 could also curve in the opposite direction, or could extend in straight lines toward drainage conduit 26 if desired. Also, each of the baffles could terminate at radially directed inner ends if desired.

All of the radial filtrate channels are of the same size and configuration. The flow cross sections of the radial filtrate channels become progressively smaller in the radially inward direction, thereby accelerating flow toward the discharge conduit. To accomplish this, each radial channel 72 is of a constant width and becomes progressively smaller in length in the radially inward, downstream direction.

The radial filtrate channels 72 are substantially fewer in number, preferably less than one-half, than axial surface channels 44. In this way, the radial channels act to collect, confine, direct and accelerate the filtrate flow into the discharge conduit but without creating any appreciable increase in flow resistance that might otherwise counteract the increased flow efficiency produced by the baffles.

Figure 3:
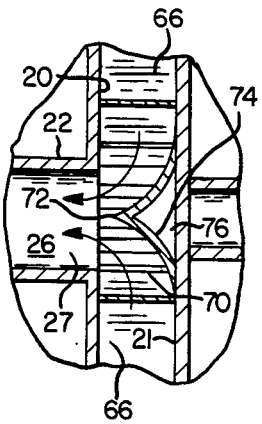
FIG. 3 is a sectional view taken along line 3—3 of FIG. 2.

Referring more specifically to FIG. 3, a curved flow passage means is provided centrally in the radial channel 24 against wall 21. The curved flow passage means comprises a hollow, concavely curved cone-like member 74. Member 74 has a broad proximal base end 76 directed toward flow-confining wall 21 and a narrower distal end 78 directed toward the entrance to drainage conduit 26. As a result, member 74 helps define a curved flow path in the transition between radial channels 72 and axial conduit 26, reducing the opportunity for turbulence and flow resistance at this point. Member 74 also further restricts the flow cross section at this transition section, thereby further accelerating discharge flow at this point. The overall effect is to reduce flow resistance and acclerate flow, increasing the ability of the applied suction to efficiently remove filtrate from the drum and thereby reducing the possibility that filtrate in the deck channels will rewet the mat as the drum rotates.

A combined effect of reducing turbulence, other flow resistance, and corresponding head loss, and of accelerating filtrate flow into the axial drainage conduit is to increase the effectiveness of vacuum pressure available at the surface filtrate compartments 44. As a result, the pulp mat is rapidly dewatered, and the filtrate is rapidly removed from the surface compartments and drum.

An additional advantage of the present invention is that it can be applied as a retrofit to existing center valve drums as well as to new drums.

It should be understood that various changes and modifications of the preferred embodiment described herein will be apparent to those skilled in the art. Such changes and modifications can be made without departing from the spirit and scope of the present invention. It is, therefore, intended that such changes and modifications be covered by the following claims.

I claim:

1. In a center valve rotary drum filter for separating wood pulp from its filtrate, including means for supplying subatmospheric pressure, the drum having means defining axially extending surface filtrate channels arranged about the periphery of the drum, the filtrate channels opening into a common central circumferential valve opening, the valve opening being in fluid communication with a drainage conduit centrally disposed and extending axially within the drum, said drainage conduit being in communication with said subatmospheric pressure supply means, the filter further including a stationary valve member seated within a peripheral arcuate segment of the valve opening to close off surface filtrate channels leading to said segment from communication with said subatmospheric pressure supply means, said valve opening being defined by a pair of axially spaced radially extending flow-confining walls, the improvement comprising:

a plurality of generally radially disposed baffle means circumferentially spaced apart and positioned within said valve opening downstream of the stationary valve, said baffle means extending between the flow-confining walls and subdividing the valve opening into generally radial discrete filtrate flow channels for channelling filtrate flow from the surface filtrate channels into means defining a central opening of said drainage conduit; and curved flow passage means between said flow-confining walls, said flow passage means being curved toward the central axis of the drainage conduit for directing filtrate flow to the drainage conduit.

2. An apparatus according to claim 1 wherein the number of radial filtrate channels is substantially fewer than the number of axial surface channels.

3. An apparatus according to claim 1 wherein the number of radial filtrate channels is no more than one-half the number of axial surface channels.

4. An apparatus according to claim 1 wherein the flow cross-section of each radial filtrate channel becomes progressively smaller in the radially inward, downstream direction.

5. An apparatus according to claim 1 wherein the flow cross-section of each radial filtrate channel is of a constant width and progressively smaller length in the radially inward, downstream direction.

6. An apparatus according to claim 1 wherein the baffle means are curved as the drum is viewed in vertical cross-section to define curved radial filtrate channels.

7. An apparatus according to claim 6 wherein the radial filtrate channels curve toward the drainage conduit in a direction opposite the direction of rotation of the drum.

8. An apparatus according to claim 1 wherein each of the baffle means terminates at an inner end generally tangential to the central drainage conduit.

9. An apparatus according to claim 1 wherein each of the radial filtrate channels is of the same size and configuration.

10. An apparatus according to claim 1 wherein said curved flow passage means comprises a concavely curved, cone-like member having a broad proximal base end and a narrower distal end, said base end being directed toward the one of said radial flow-confining walls opposite the entrance to said drainage conduit, said distal end being directed toward the central axis of said drainage conduit.

11. An apparatus according to claim 1 wherein said pair of flow-confining walls are joined together by equally circumferentially spaced-apart outer and inner axially extending support members, said inner support members comprising flat bars adjacent to said drainage conduit and oriented to minimize flow turbulence, each said baffle means extending from an outer support member to an inner said flat bar.

12. In a center valve rotary drum filter for separating wood pulp from its filtrate, including means for supplying subatmospheric pressure, the drum having means defining axially extending surface filtrate channels arranged about the periphery of the drum, the filtrate channels opening into a common central circumferential valve opening, the valve opening being in fluid communication with a drainage conduit centrally disposed and extending axially within the drum, said drainage conduit being in communication with said subatmospheric pressure supply means, the filter further including a stationary valve member seated within a peripheral arcuate segment of the valve opening to close off surface filtrate channels leading to said segment from communication with said subatmospheric pressure supply means, said valve opening being defined by a pair of axially spaced radially extending flow-confining walls, the improvement comprising:

a plurality of generally radially disposed baffle means circumferentially spaced apart and positioned within said valve opening downstream of the stationary valve, said baffle means extending between the flow-confining walls and subdividing the valve opening into generally radial discrete filtrate flow channels for channelling filtrate flow from the surface filtrate channels into means defining a central opening of said drainage conduit;

the number of radial filtrate channels being no more than one-half the number of axial surface channels, each of the radial filtrate channels being of the same size and configuration;

the baffle means being curved as the drum is viewed in vertical cross section to define curved radial filtrate channels;

the flow cross-sections of the radial filtrate channels becoming progressively smaller in the radially inward, downstream direction;

said flow-confining walls being joined together by equally circumferentially spaced-apart outer and inner axially extending support members, said inner support members comprising flat bars adjacent to said drainage conduit and oriented to minimize flow turbulence, each said baffle means extending from an outer support member to an inner said flat bar; and curved flow passage means between said flow-confining walls, said flow passage means being curved toward the central axis of the drainage conduit for directing filtrate flow to the drainage conduit.

13. An apparatus according to claim 12 wherein said curved flow passage means comprises a concavely curved, cone-like member having a broad proximal base end and a narrower distal end, said base end being directed toward the one of said radial flow-confining walls opposite the entrance to said drainage conduit, said distal end being directed toward the central axis of said drainage conduit.

* * * * *